(12) United States Patent
Bietry

(10) Patent No.: US 9,588,331 B2
(45) Date of Patent: Mar. 7, 2017

(54) APOCHROMATIC OPTICAL DESIGN

(71) Applicant: Joseph R. Bietry, Rochester, NY (US)

(72) Inventor: Joseph R. Bietry, Rochester, NY (US)

(*) Notice: Subject to any disclaimer, the term of this patent is extended or adjusted under 35 U.S.C. 154(b) by 176 days.

(21) Appl. No.: 14/548,329

(22) Filed: Nov. 20, 2014

(65) Prior Publication Data

US 2016/0147059 A1    May 26, 2016

(51) Int. Cl.
  *G02B 23/00*    (2006.01)
  *G02B 27/00*    (2006.01)
  *G02B 9/34*    (2006.01)

(52) U.S. Cl.
  CPC ........... *G02B 23/00* (2013.01); *G02B 27/005* (2013.01); *G02B 9/34* (2013.01)

(58) Field of Classification Search
  CPC ........ G02B 9/34; G02B 23/00; G02B 13/004; G02B 13/18; G02B 13/0015; G02B 15/173; Y10T 29/49826
  USPC ....... 359/399, 404, 652, 654, 661, 642, 665, 359/708, 738, 748, 793–795, 797
  See application file for complete search history.

(56) References Cited

U.S. PATENT DOCUMENTS

| 2,698,555 | A |   | 1/1955 | McCarthy |   |
|---|---|---|---|---|---|
| 5,071,238 | A | * | 12/1991 | Richard | G02B 23/00 359/708 |
| 9,235,038 | B1 | * | 1/2016 | Seward | G02B 9/12 |
| 2009/0059163 | A1 | * | 3/2009 | Pinto | A61F 2/14 351/159.01 |

FOREIGN PATENT DOCUMENTS

| WO | WO 2006/091181 |   | 8/2006 |   |
|---|---|---|---|---|
| WO | WO 2006091181 | A1 * | 8/2006 | ............. G02B 13/02 |

OTHER PUBLICATIONS

Roman Duplov, "Apochromatic telescope without anomalous dispersion glasses", Applied Optics, vol. 45 No. 21, Jul. 20, 2006, pp. 5164-5167.

* cited by examiner

*Primary Examiner* — Scott J Sugarman
*Assistant Examiner* — Mustak Choudhury
(74) *Attorney, Agent, or Firm* — Louis S. Horvath

(57) ABSTRACT

An apochromatic imaging system has an object-side lens group having at least an object-side lens element with positive refractive power and formed from a flint glass material with deviation of relative dispersion $-0.013 < \Delta P_{g,F} < +0.013$ and an Abbe number less than 50. A middle lens group has at least a second lens element and a third lens element, wherein, one of the second and third lens elements has deviation of relative dispersion $-0.013 < \Delta P_{g,F} < 0.013$ and the other of the second and third lens elements has deviation of relative dispersion $0.013 < \Delta P_{g,F} < 0.04$. An image-side lens group has at least a fourth lens element.

19 Claims, 15 Drawing Sheets

Table 1

| ELEMENT NUMBER | RADIUS OF CURVATURE FRONT | RADIUS OF CURVATURE BACK | THICKNESS | APERTURE DIAMETER FRONT | APERTURE DIAMETER BACK | GLASS |
|---|---|---|---|---|---|---|
| OBJECT | INF | | INFINITY | | | |
| | | | 0.0000 | 152.0000 | | |
| 1 | 254.1357 CX | 450.6144 CC | 12.0000 | 152.0000 | 150.2331 | STIH3 Ohara |
| | | | 289.0918 | | | |
| | | | APERTURE STOP | 90.0000 | | |
| 2 | 284.2064 CX | -167.3545 CX | 14.0000 | 90.0000 | 89.0446 | SFPL51 Ohara |
| | | | 1.0637 | | | |
| 3 | -168.4417 CC | 335.8942 CC | 9.0000 | 88.2488 | 86.2948 | STIH3 Ohara |
| | | | 547.9972 | | | |
| 4 | 1139.5935 CX | -661.5945 CX | 8.0000 | 86.0000 | 92.8800 | STIH3 Ohara |
| | | | 399.3565 | | | |
| IMAGE | IMAGE DISTANCE = -1000.0000 CC | | | 39.9793 | | |

*FIG. 10*

APOCHROMATIC OPTICAL DESIGN

FIELD OF THE INVENTION

This invention generally relates to design of optical systems and more particularly relates to lens design for refracting telescopes and similar devices having a narrow field of view.

BACKGROUND OF THE INVENTION

Optical systems characterized by a relatively narrow field of view, such as refracting telescopes and various long-range viewing apparatus of similar design, have a number of characteristic limitations affecting optical performance. Among these is chromatic aberration, largely due to the dispersive properties of glass. Dispersion of an optical substrate causes the refraction of a lens to vary with wavelength, so that, for conventional optical glass, the index of refraction is higher for short wavelengths and decreases as wavelength increases. As a result of chromatic aberration, blue light rays come to focus closer to the lens than do red light rays.

The problem of chromatic aberration in telescopes has been addressed in a number of ways. Use of a very slow focal ratio (high ratio of focal length to lens diameter or f-number), on the order of f/150 reduces the severity of the aberration but results in devices that are extremely long and, at best, mechanically cumbersome. In the Newtonian reflecting telescope, mirrors are used in place of lens elements in order to reduce chromatic aberration; however, this approach tends to increase a number of monochromatic aberrations.

Different types of optical glass exhibit different dispersive properties, conventionally specified in terms of Abbe number or in terms of partial dispersion. For each type of glass, optical glass manufacturers provide Abbe number and partial dispersion information, along with refractive index values at one or more standard wavelengths. Crown glass has relatively low dispersion and high Abbe number. Flint glass has relatively high dispersion and low Abbe number. Taking advantage of these differences, telescope objective designers developed the achromatic doublet that combines low and high dispersion glass. This solution provides a measure of correction for chromatic aberration, allowing optical systems with lower f-number, on the order of f/15, and correspondingly reducing the required length of the telescope device. With a well-designed achromatic doublet, the focal points for red and blue light become substantially coincident, but still differ from the focal point for green light. This leaves some amount of chromatic aberration, termed secondary color.

Further development and understanding of glass types with anomalous dispersion properties has helped to improve imaging performance by reducing chromatic aberrations. Apochromatic doublets using anomalous dispersion glass types have allowed focal ratios to shrink further, to about f/10. With the addition of a third element, apochromatic triplets extended the focal ratio range to about f/8 and, in addition, help to reduce monochromatic aberration. Addition of more elements and the development of superachromats have provided correction that reduces aberration to very low levels and improved image quality accordingly, at higher cost and complexity.

Significantly, more highly anomalous glass types can be particularly effective for use in color correction. At the same time, however, these highly anomalous glass types are increasingly expensive and can be difficult to fabricate.

Solutions for telescopes providing near-apochromatic performance using common optical glass have been proposed, such as those described in International Publication No. WO 2006/091181 by Duplov. Duplov presents a 5- to 7-element design that provides some level of apochromatic performance using only normal glasses. This design, however, does not provide well-behaved control of color. Significantly, the Duplov arrangement requires that the track length of a telescope that is designed using these optics must be from about 1.75 to 2.5 times the focal length, which is disadvantageous.

Thus, it is seen that there is a need for optical designs for telescopes and other afocal optical apparatus that provides a high level of color correction without the cost and dimensional requirements of earlier solutions.

SUMMARY OF THE INVENTION

It is an object of the present invention to advance the art of telescopic and other types of imaging that have a narrow field of view. With this object in mind, the present disclosure describes an apochromatic optical design that provides superior optical performance without the added cost and complexity of triplet lens arrangements and without requiring highly anomalous glass types.

It is a feature of the present invention that it provides good color correction using only a small number of lenses and employing anomalous glass at a point in the optical system where a smaller lens can be used.

The present disclosure provides an apochromatic imaging system comprising:
  a) an object-side lens group having at least an object-side lens element with positive refractive power and formed from a flint glass material with deviation of relative dispersion $-0.013 < \Delta P_{g,F} < +0.013$ and an Abbe number less than 50;
  b) a middle lens group comprising at least a second lens element and a third lens element, wherein, one of the second and third lens elements has deviation of relative dispersion $-0.013 < \Delta P_{g,F} < 0.013$ and the other of the second and third lens elements has deviation of relative dispersion $0.013 < \Delta P_{g,F} < 0.04$; and
  c) an image-side lens group having at least a fourth lens element.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

FIG. 10 shows a table of design specifications for an optical apparatus according to an embodiment of the present invention.

DETAILED DESCRIPTION OF THE INVENTION

Figure 1:
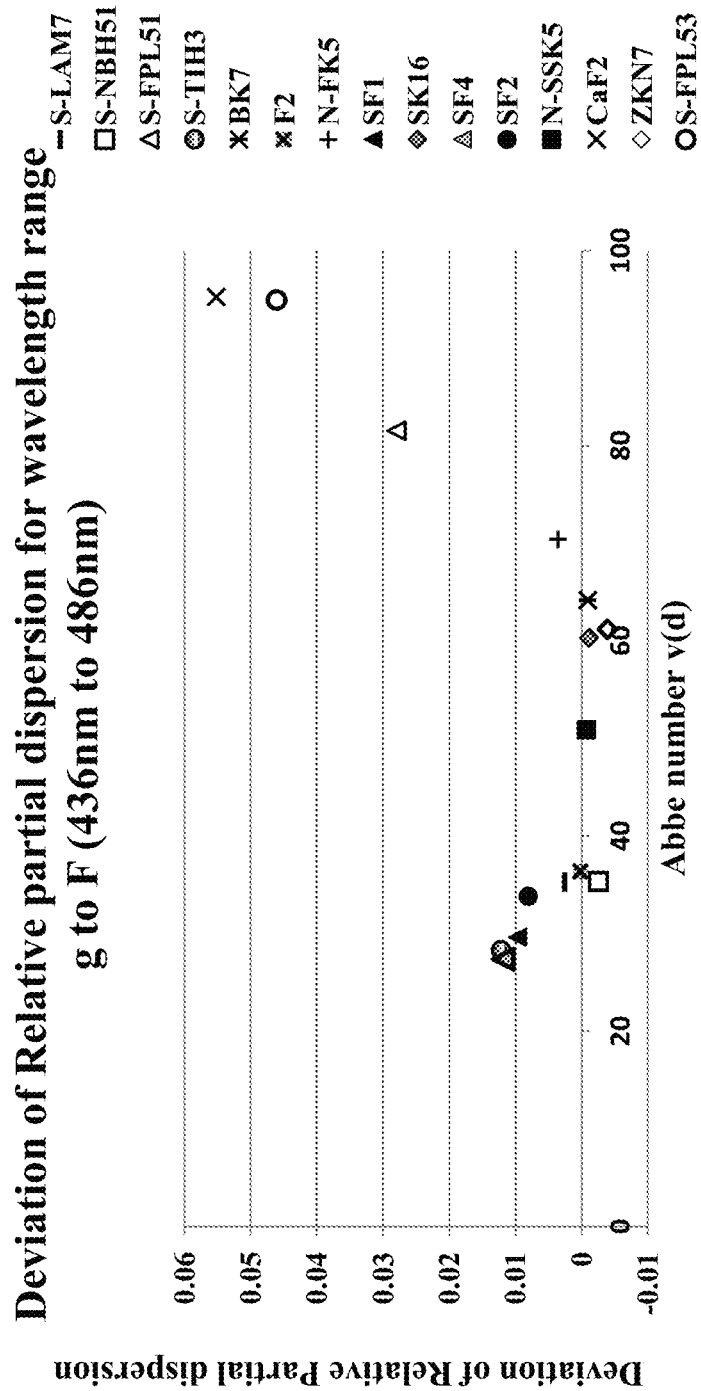
FIG. 1 is a graph showing deviation of relative partial dispersion for a sampling of optical glasses with different Abbe values.

The present description is directed in particular to elements forming part of, or cooperating more directly with, apparatus in accordance with the invention. It is to be understood that elements not specifically shown or described may take various forms well known to those skilled in the art.

Where they are used, the terms "first", "second", and so on, do not necessarily denote any ordinal, sequential, or priority relation, but are simply used to more clearly distinguish one element or set of elements from another, unless specified otherwise.

In the context of the present disclosure, the term "coupled" is intended to indicate a mechanical association, connection, relation, or linking, between two or more components, such that the disposition of one component affects the spatial disposition of a component to which it is coupled. For mechanical coupling, two coupled components need not be in direct contact, but can be linked through one or more intermediary components.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

In an optical apparatus, the term "track length" refers to the distance from the front element of a lens system to the image plane. For most optical instruments, it is most beneficial to have the track length as short as possible. For a telescope, for example, the track length directly determines the length of the telescope tube.

An afocal imaging system is considered to have infinite conjugates, therefore no focal length. In practice, some finite focal length exists; however, the term "afocal" or "infinite conjugate" imaging system is understood to include telescopes and other optical apparatus that have both object and image at infinity.

In the context of the present invention, the term "dialyte" refers to a widely air-spaced achromatic doublet telescope objective.

In the context of the present disclosure, a "lens group" can have one or more lens elements.

In the context of the present disclosure, a small or narrow field of view (FOV) optical system has a field of view no larger than about +/−10 degrees. A typical narrow FOV system has a field of view that is within about +/−6 degrees.

Factors that are acknowledged to be particularly significant in selection of optical glass for telescopes and similar systems are refractive index at a standard wavelength, typically at the helium yellow d wavelength at 587.6 nm, and V number or Abbe number, a value that quantifies variation in refraction with wavelength. The V number or Abbe number is inversely related to dispersion, so that the higher the V number, the lower the dispersion. Generally, flint glass has Abbe or V numbers below about 50; crown glass has Abbe or V numbers exceeding 50.

Glasses are often characterized with relation to a plot of relative partial dispersion versus Abbe number. In graphs of this relationship provided by glass manufacturers, the bulk of standard optical glasses fall close to a nearly straight line known as the Abbe normal line or "normal" glass line. These glasses are called normal glasses or glasses with normal partial dispersions and may be termed "non-anomalous" glass materials in the context of the present disclosure. Glasses of this type are generally inexpensive, easy to fabricate, and readily available.

Other glasses that fall significantly away from the normal glass line include glasses with anomalous partial dispersion, also called anomalous dispersion glasses or abnormal glasses. In general, anomalous glass is increasingly expensive as it deviates further from the normal glass line. In the context of the present disclosure, the term "anomalous glass" refers to glass that exhibits dispersion properties that differ from those typically encountered for optical materials. As noted earlier, because of dispersion in most optical glasses, the index of refraction, usually expressed as n, is higher for short wavelengths and decreases as wavelength increases. However, for anomalous glasses and materials, the refractive index n behaves differently over different portions of the wavelength band.

There are different types of anomalous glass, having varying degrees of anomalous behavior. In the context of the present disclosure, anomalous glasses are classified using deviation of relative partial dispersion $\Delta P_{g,F}$ or $\Delta$RPD. Deviation of relative partial dispersion $\Delta P_{g,F}$ or $\Delta$RPD is a measure of the relative rate of change of the slope of the index vs. wavelength relationship for a type of glass and is computed:

$$\Delta P_{g,F} = \frac{n_g - n_F}{n_F - n_c} - (0.6438 - 0.001682 \cdot v_d) \qquad (1)$$

wherein $n_F$ is the index of refraction at the blue hydrogen F line wavelength (486 nm);

$n_e$ is the index of refraction at 546 nm;

$n_c$ is the index of refraction at the hydrogen C line wavelength (656 nm);

$n_g$ is the index of refraction at the mercury blue line wavelength (436 nm);

$v_d$ is the Abbe number, given at the yellow d line wavelength (588 nm); and values 0.6438 and 0.001682 are empirically derived constants.

In the context of the present disclosure, anomalous glasses are those having, over the spectral range from 436 to 486 nm, deviation of relative partial dispersion $\Delta P_{g,F}$ above 0.013. Highly anomalous glass has deviation of relative partial dispersion $\Delta P_{g,F}$ above 0.04. Highly anomalous materials include most fluor crown and short flint glasses. The graph of FIG. 1 shows deviation of relative partial dispersion plotted against Abbe number for a number of commercially available glass types. Moderately anomalous glass has deviation of relative partial dispersion $\Delta P_{g,F}$ that is within the range: $0.013 < \Delta P_{g,F} < 0.04$ In the context of the present disclosure, normal optical glass is optical glass having deviation of relative partial dispersion $\Delta P_{g,F}$ in the range $-0.013 < \Delta P_{g,F} < +0.013$ when considered over the visible range (400-700 nm).

From an optical design perspective, the highly anomalous fluorite (CaF2) crystal, with $\Delta P_{g,F}$ at 0.0552 can have particular value in lens combinations that reduce chromatic aberration. CaF2 has excellent color correction ability, but this advantage is offset by very high cost and difficulty in manufacture due to susceptibility to thermal shock as well as sensitivity to surface attack from solutions used in grinding and polishing. Other highly anomalous glasses, such as S-FPL53, with $\Delta P_{g,F}$ at 0.0461, for example, have useful characteristics but remain high in cost. Moderately anomalous glass, as defined above, is lower in cost and more readily workable than CaF2 and other highly anomalous alternatives.

Figure 2A:
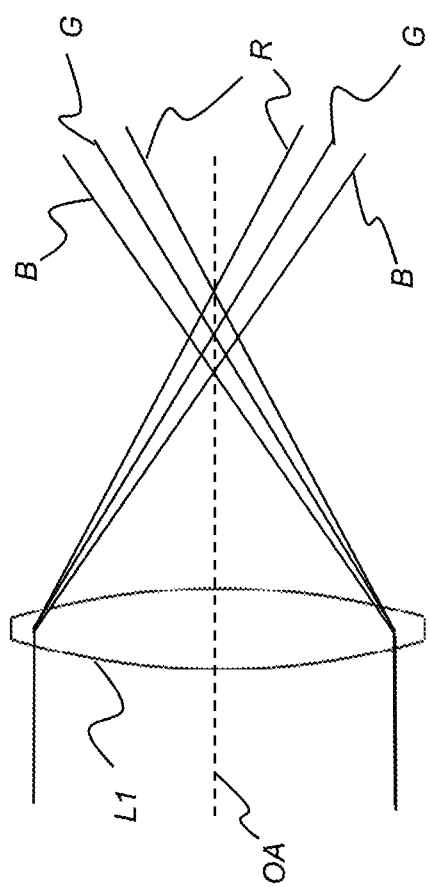
FIG. 2A shows how lens dispersion causes primary axial color.
Figure 2B:
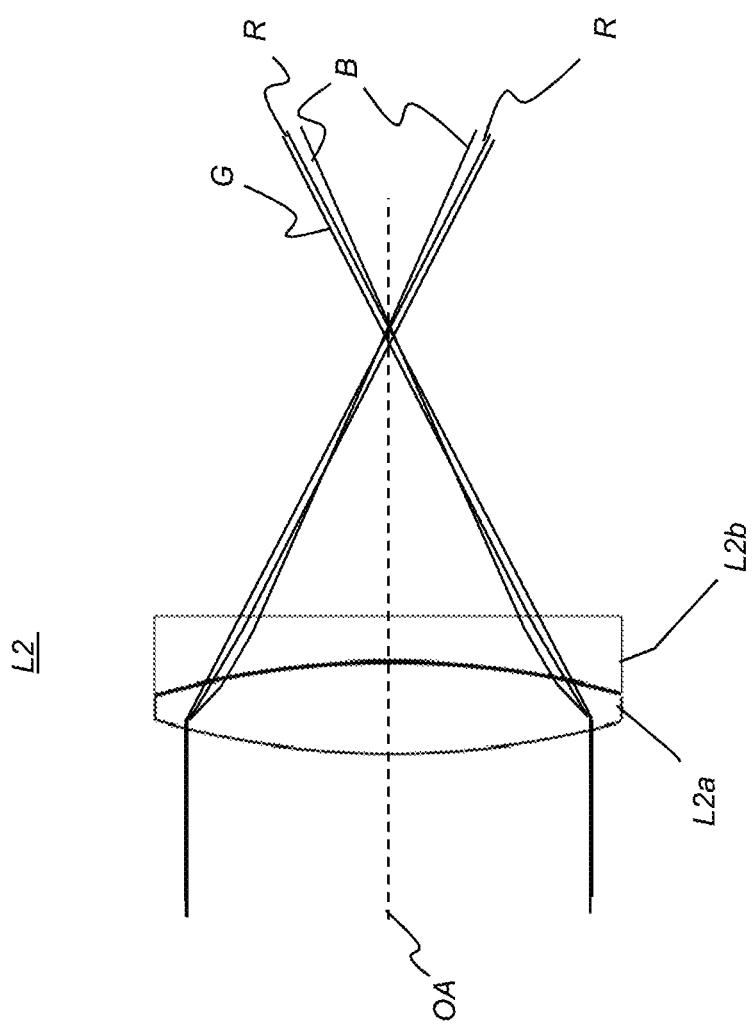
FIG. 2B shows how lens dispersion causes secondary axial color.

For a better understanding of the present invention, it is instructive to review some basics of color aberration and compensation techniques that have been successful. FIG. 2A shows primary axial color, a chromatic aberration in which dispersion from a lens L1 causes a focal length difference between Red (R), Green (G) and Blue (B) wavelengths. The optical axis OA is represented by a dashed line. FIG. 2B shows how primary axial color is corrected by an achromatic doublet lens L2, which is a lens group having a crown glass lens element L2a of a low dispersion glass and a negative lens element L2b having a flint glass of higher dispersion. Using doublet L2, the R and B wavelengths have a common focus, reducing chromatic aberration but still having a residual chromatic aberration termed secondary axial color. The flint glass and crown glass materials for achromatic doublet L2 are both selected from non-anomalous materials on or near the normal glass line.

Figure 2C:
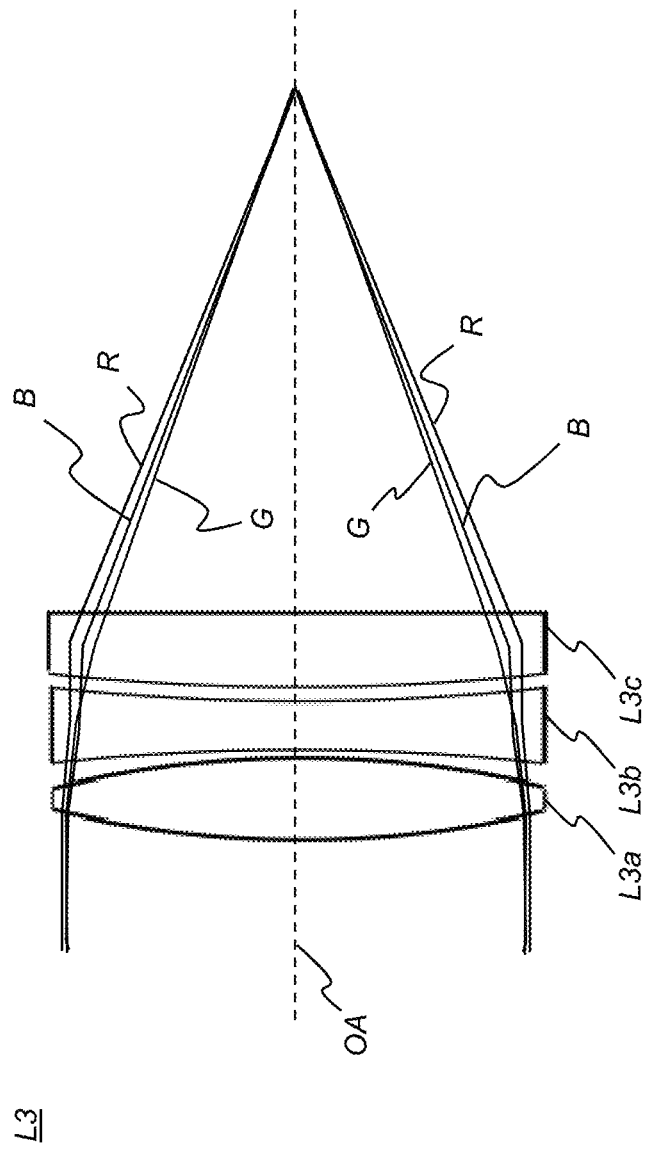
FIG. 2C shows apochromatic correction of secondary axial color.

Apochromatic triplets, such as lens L3 as shown in FIG. 2C, have been developed in order to compensate secondary color and bring each of the R, G, B wavelengths to a common focus. Lens L3 is a group of lens elements L3a, L3b, and L3c. These advanced lens designs take advantage of anomalous optical materials, either as part of a doublet design or in a triplet arrangement, providing a lens group that has a single lens element of anomalous optical glass sandwiched between two lens elements that use more conventional glass types.

Apochromatic and even super-apochromatic lens designs can provide a good measure of correction for secondary axial color. However, this improvement typically comes at a hefty price, so that lens solutions that are highly color-corrected can be prohibitively costly. The use of anomalous optical glasses, often considerably more expensive and typically much more difficult to fabricate than their non-anomalous counterparts, makes many highly corrected lens solutions impractical for all but highly specialized and costly optical apparatus.

In most professional quality (color corrected) telescope objective designs, at least one of the lens elements is made from a highly anomalous dispersion material. A review and brief comparison of some of the conventional color-corrected telescope designs is instructive for an understanding of aspects of the present invention. Telescope objective designs in widest use fall generally into two categories, the single optical group type and the separated two optical group type. The single group type generally uses three elements in close proximity to each other, with the elements approximately the same diameter, defining the telescope aperture. The separated two group type usually uses four elements with two elements in each group. The most common design form of this type is the Petzval design.

Figure 3A:
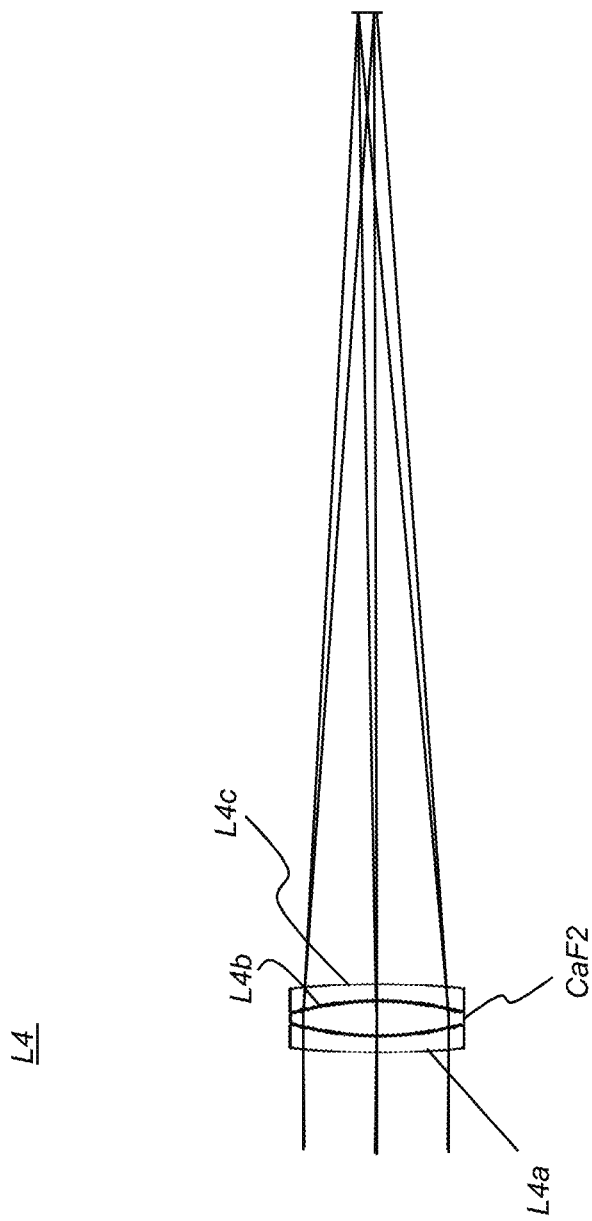
FIG. 3A shows a conventional triplet for color correction using a fluorite lens element.
Figure 3B:
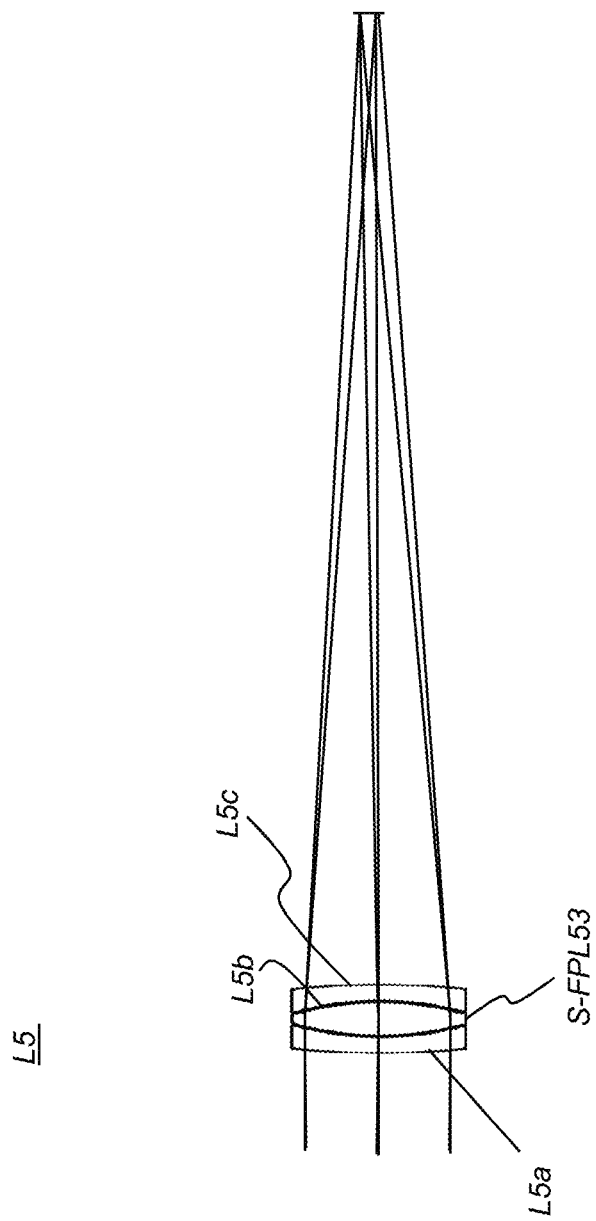
FIG. 3B shows a conventional triplet for color correction using a lens element having a highly anomalous material.

FIG. 3A shows an optical layout for a fluorite triplet L4 that is formed as a lens group that has a fluorite (CaF2) lens element L4b sandwiched between lens elements L4a and L4c that are of more robust normal optical glasses (for example, Schott ZKN7). FIG. 3B shows an optical layout for a triplet L5 that uses an anomalous glass lens L5b (of material S-FPL53) sandwiched between lenses L5a and L5c that are of more robust normal optical glasses. Track lengths for both corrected triplet types are relatively short, in the range from (1× focal length) to (1.1× focal length).

Figure 3C:
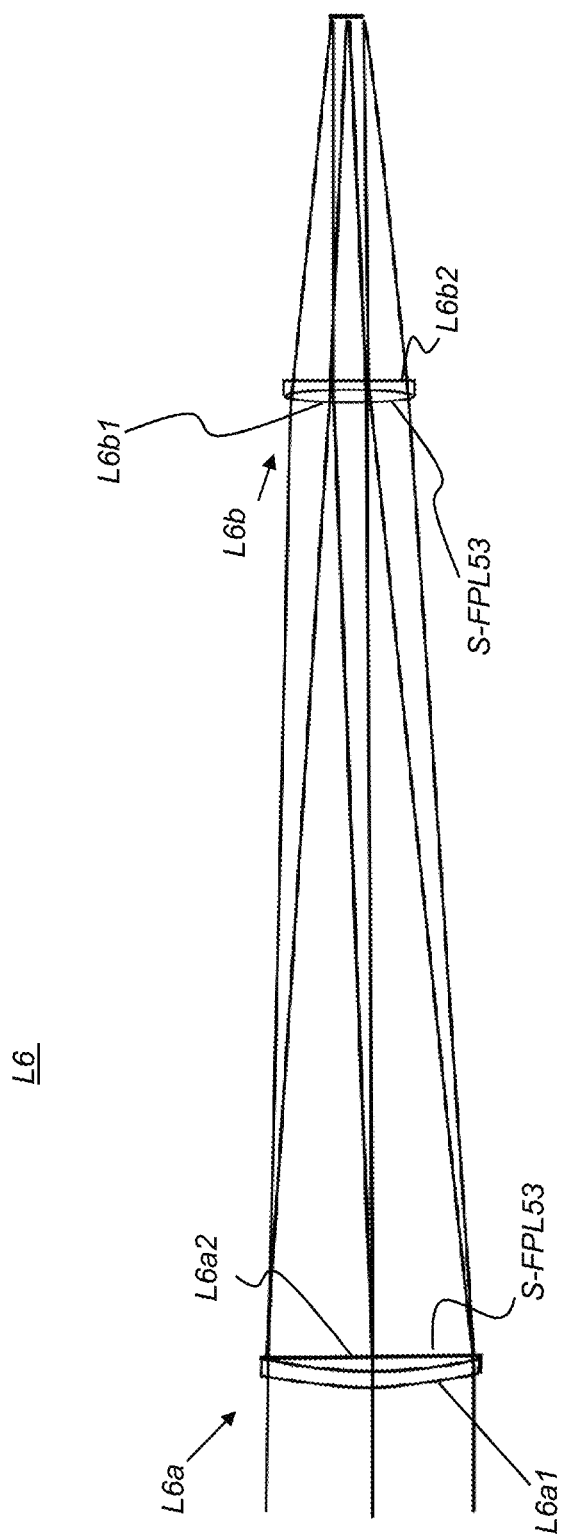
FIG. 3C shows a conventional Petzval optical arrangement.

FIG. 3C shows a lens L6 with the conventional Petzval arrangement. The two lens groups are two doublets L6a and L6b, spaced apart by a significant distance. Each of doublets L6a and L6b has one lens of a normal glass type and one lens of a highly anomalous glass type, such as the S-FPL53 glass indicated. The first or object-side two element group L6a has positive optical power and its diameter defines the aperture of the telescope. The second group L6b is spaced substantially away from the first group and its diameter is smaller than the first and also has positive optical power. The anomalous glass is generally internal to the telescope optics to provide protection to the less robust optical material. This requirement for two lenses of highly anomalous material makes the Petzval configuration relatively expensive. Track length for the Petzval system is in the range from about 1.41 to 1.55× focal length.

For considering their relative performance, designs that follow the basic configurations of FIGS. 3A-3C can be compared against each other using their corresponding Strehl relationships. The Strehl ratio gives a useful indication of the energy distribution provided by an optical component. The Strehl value is normalized, so that a value of 1.0 indicates the maximum possible Strehl ratio, which is never achieved in practice.

Figure 4:
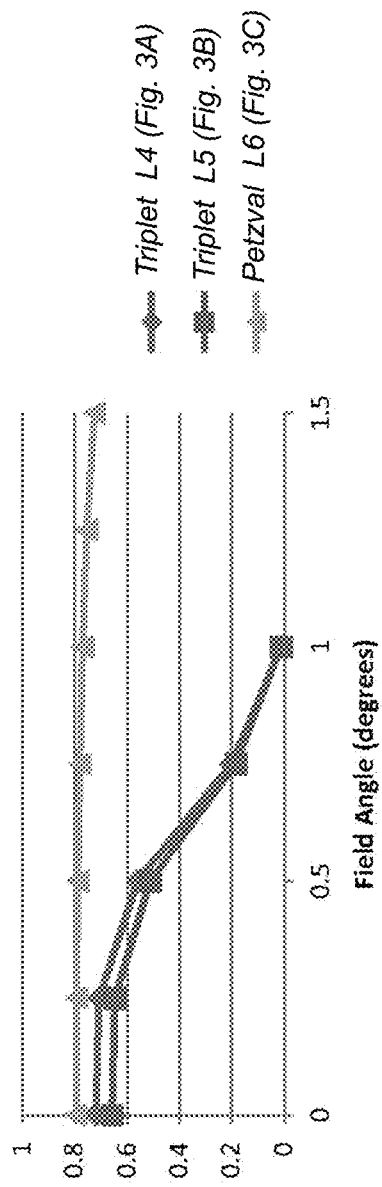
FIG. 4 shows typical Strehl ratios for the designs shown in FIGS. 3A-3C, plotted against field angle.

The graph of FIG. 4 compares polychromatic Strehl measurements vs. field angle for the conventional designs shown in FIGS. 3A-3C. A high Strehl ratio value (near 1.0) indicates better performance. Polychromatic Strehl calculation gives equal weight to each of wavelengths r (He) at 706.5 nm; 685 nm; C (H) at 656.3 nm; e (Hg) at 546.1 nm; F (H) at 486.1 nm; g (Hg) at 435.8 nm; and h (Hg) at 404.7 nm. As can be seen from FIG. 4, the Petzval configuration of FIG. 3C provides the highest Strehl ratio of the compared systems over a range of field angles.

The relatively high cost of anomalous glass has motivated attempts to find optical solutions that provide good performance using only normal glass types. One recent example of this effort is described in WO 2006/091181 by Duplov that teaches a multi-element optical system having three widely spaced lens groups formed using normal optical glass. For some of the lens elements, Duplov suggests optional inclusion of some glasses with coordinates at some distance from the normal glass line but having an amount of anomalous dispersion that is less than that of most fluor crown and short flint glasses. Anomalous glass types that are specifically mentioned as candidates in Duplov '1181 are glass types that would not be sufficiently anomalous to be used with conventional apochromats (FIG. 2C), including dense flint glasses, dense barium crown glasses, dense barium flint glasses, and lanthanum flint and crown glasses.

The Duplov designs, however, fail to achieve suitable performance when compared to conventional approaches. The graph of FIG. 5 compares computed polychromatic Strehl ratio measurements vs. field angle for the seven-element normal glass optical system described by Duplov relative to the designs shown in FIGS. 3A-3C.

Figure 5:
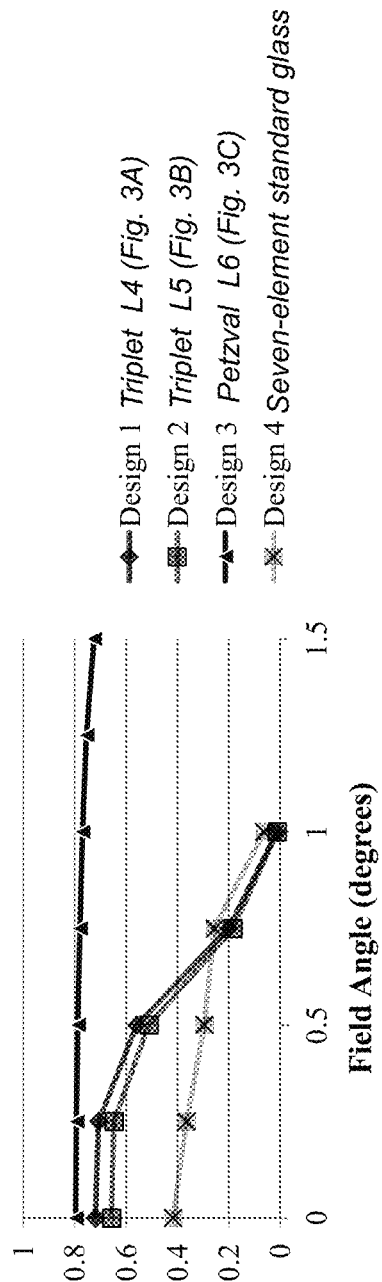
FIG. 5 shows typical Strehl ratios compared against a seven-element normal glass configuration.

As can be readily seen from the graph of FIG. 5, solutions based on standard normal glass combinations do not perform well relative to Petzval or triplet solutions. Moreover, the track length of the Duplov system far exceeds that of the Petzval and triplet solutions, with values ranging from 1.75 to 2.5× focal length. Thus, solutions such as that proposed by Duplov appear to be moving in the wrong direction, requiring longer telescope tubes and exhibiting compromised performance, as evidenced by the disappointing Strehl ratio.

The conventional solutions shown in FIGS. 3A through 3C benefit from the use of highly anomalous glass types, having a relatively large $\Delta P_{g,F}$ and, correspondingly, having coordinates at a significant distance from the normal glass line. Duplov suggests use of the cheaper glass types that are slightly anomalous, having a relatively small $\Delta P_{g,F}$ and thus not widely distant from the standard or normal glass line N. The Applicant, however, has found solutions that utilize a different region of the glass map and include optical materials that are more anomalous than those identified by Duplov, but that would still provide disappointing performance for use with apochromatic optical systems. In addition, the Applicant's approach uses an arrangement of optical materials that appears to violate conventional practice for optical design of narrow field-of-view systems and, in doing so, surprisingly achieves higher calculated optical performance than is obtained by conventional designs.

It has been noted that, in the achromatic doublet, crown glass is used for the positive lens element, and flint glass for the negative lens element. This positive-crown, negative-flint pattern is well-established and is followed as a rule in achromatic doublet design where a positive focal length is needed. There may be a case where an achromat with negative focal length could be formed with a positive power flint and negative power crown; however, a negative focal length lens would not be suitable for a telescope or other afocal imaging system.

When a positive lens element in the objective lens position is in the position closest to the object of an afocal or narrow field-of-view optical system, the positive lens element is formed from crown glass, and for good reason. Conventional approaches for color correction work only where crown glass, rather than flint glass, is the positive objective lens in the path of substantially collimated light (light parallel to the optical axis of an objective lens from an object at considerable distance, considered to be light at infinite conjugate). These color correction approaches are not effective for substantially collimated light that is refracted through a positive lens having the high dispersion levels of flint glass. It is well understood that directing light from a distant object through flint glass provides levels of dispersion that are excessive for color correction with conventional methods. Thus, doublets are not fabricated with flint glass positive-power lens elements and crown glass negative-power lens elements.

In contradiction to conventional wisdom in afocal and narrow FOV optics design, the inventor has found that a positive lens of flint glass can be used as the first lens element in the objective of a telescope lens using an alternative approach to color correction, resulting in a narrow field of view optical system that is advantaged for imaging and color correction with a high Strehl ratio and that further reduces track length over other color-corrected, multi-element air-spaced designs.

Embodiments of the present invention provide a narrow field of view imaging apparatus having a plurality of lens groups, spaced apart from each other. There is an object-side lens group, a middle lens group, and an image-side lens group, each separated from the next group by air. The first or object-side lens group has an object-side lens element of positive refractive power and formed from flint glass. Stated alternatively, the lens element that lies closest to the object of the optical system is a positive lens element that is formed from a flint glass that has an Abbe number below about 50. A middle lens group that lies between the object-side lens group and an image-side lens group has a plurality of lens elements that include at least one lens formed from a moderately anomalous glass, as defined herein. The image-side group has an image-side lens that lies closest to the image formed by the optical system. The image-side lens can also be a flint glass or other normal optical glass.

Figure 6:
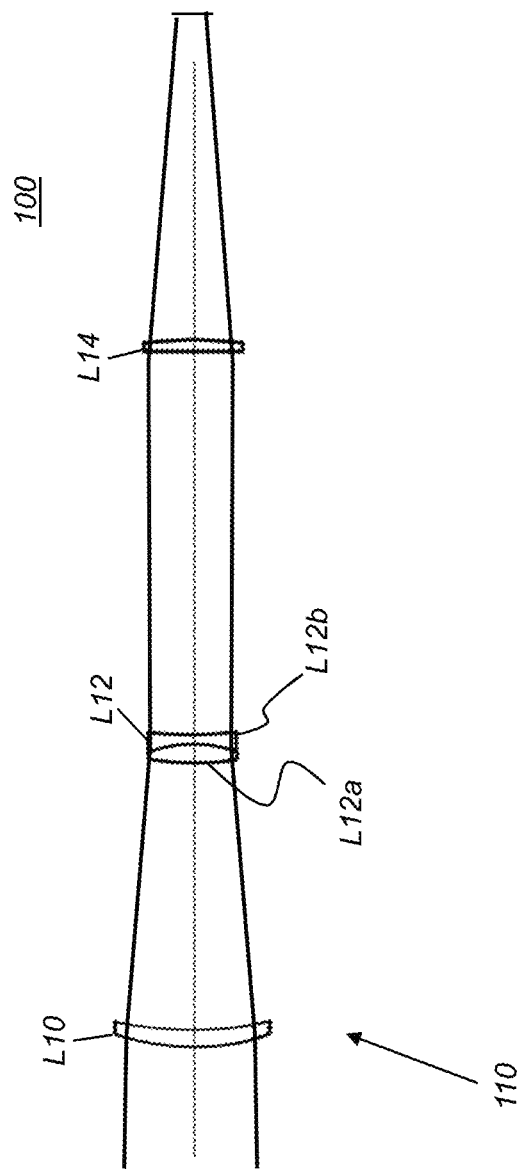
FIG. 6 shows schematic view of a telescope design having a narrow field of view according to an embodiment of the present disclosure.

Referring to FIG. 6, there is shown a diagram of a telescope optical apparatus 100 that provides substantially apochromatic color correction according to an embodiment of the present disclosure. Optical apparatus 100 has an objective 110 that uses four refractive elements in three separated lens groups, an object-side lens group L10, a second or middle lens group L12, and an image-side group L14. The first lens element in object-side lens group L10, the lens element closest to the object, is formed from a normal flint glass material, a normal optical glass whose coordinates lie on or near the glass line, so that its deviation of relative partial dispersion $\Delta P_{g,F}$ is in the range: $0.013 < \Delta P_{g,F} < 0.013$ In the FIG. 6 embodiment, the second or middle lens group L12 is a doublet that has a high dispersion (low Abbe number) element and an anomalous crown dispersion glass element. Doublet L12 is a crown/flint combination, but with the crown element, lens element L12a, of an anomalous dispersion glass having a relatively high Abbe number, typically an Abbe number of 82. The flint element L12b has an Abbe number of about 28. The third or rear lens group L14 is a single lens of a flint glass material.

Notably, optical apparatus 100 of FIG. 6 can be formed using only two types of optical glass. According to an embodiment of the present invention, outermost lens elements on the object and image side are of normal flint glass S-TIH3 (titanium flint). One material in either the middle group L12 or the image-side group L14 is an anomalous glass type, S-FPL51 in the example of FIG. 6.

FIG. 6 shows the basic model for color-corrected optical apparatus 100, which allows a number of variations. In summary, the present invention provides a telescope with three separated lens groups arranged according to the following:
(i) a front or object-side lens group L10 that has, for its lens element closest to the object, a flint glass material having positive refractive power; additional lenses of normal glass materials may be added to the initial positive flint glass lens element, provided that the positive flint glass lens element is closest to the optical object.
(ii) a middle multi-element lens group L12 that includes at least one lens element that is formed from a normal optical glass and another lens element that is formed from a moderately anomalous glass material as defined herein; lens group L12 is typically formed as a doublet but may use some other combination with additional lens elements of normal optical glass added to the normal/anomalous combination;
(iii) an image-side lens group L14; group L14 can use a single lens as shown in FIG. 6, wherein the single lens that is used can be of the same type of flint glass material that is used for the object-side lens group L10; alternately, image-side lens group L14 can have one or more lens elements that use normal glass materials.

By way of example, and not by way of limitation, Table 1 in FIG. 10 lists the optical components of the optical apparatus 100 that is described with reference to FIG. 6. Following optical design conventions, lens elements are listed in order from left to right as they appear in FIG. 6, so that object 1 in Table 1 corresponds to lens group L10, and so on.

The optical system of FIG. 6 and Table 1 has a focal length of 988 mm at f/6.5. An overall length for the telescope optics is 1280 mm. The diameter of the anomalous glass element is 90 mm CA. Advantageously, the positive optical power of the first or object-side lens group L10 reduces the diameter of lenses in the second lens group L12, allowing size and cost savings.

Figure 7:
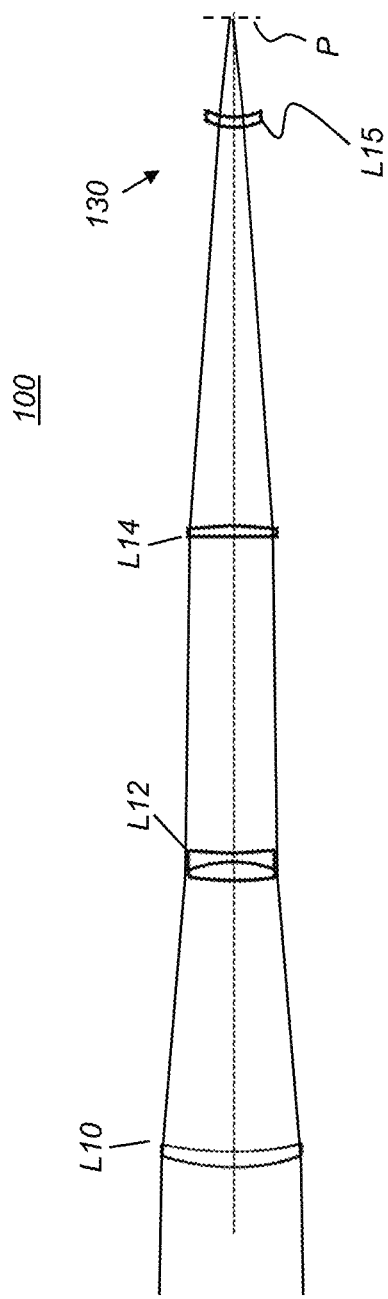
FIG. 7 shows a telescope design according to an alternate embodiment of the present disclosure using an optical field flattener.

FIG. 7 shows a schematic diagram for an alternate embodiment of optical apparatus 100 in which an optional field flattener 130 is used between the image-side lens group L14 and the image plane P. In the embodiment shown, field flattener 130 is a lens group that uses a single lens element L15.

Figure 8:
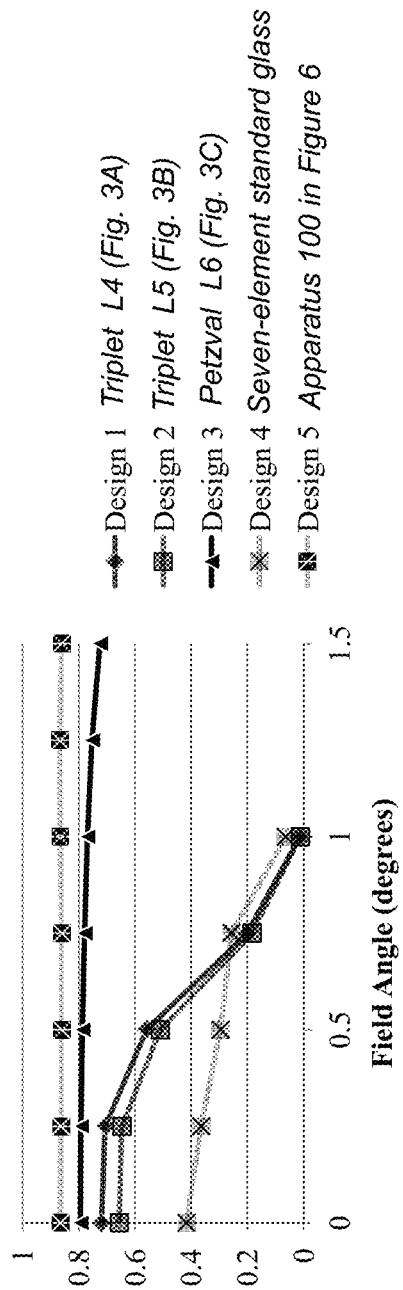
FIG. 8 compares typical Strehl ratio values for inventive and conventional configurations.
Figure 9A:
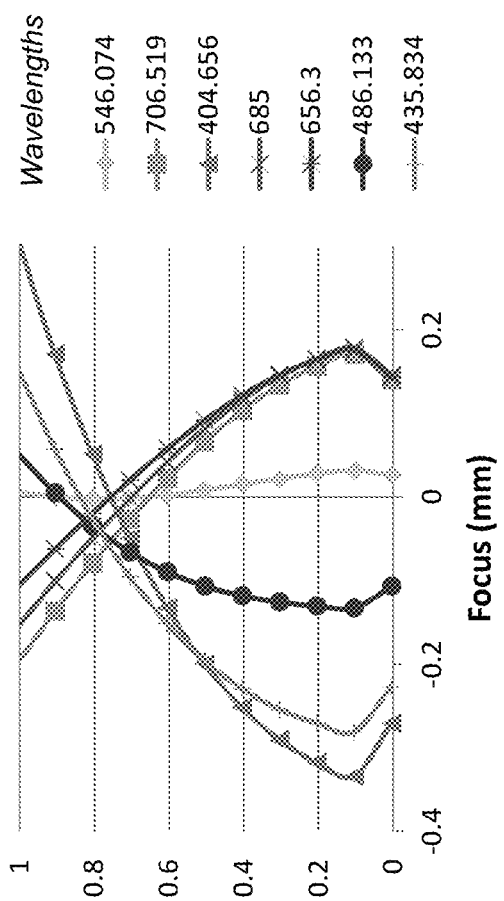
FIG. 9A is a graph that shows spherochromatism for a conventional apochromatic triplet.
Figure 9B:
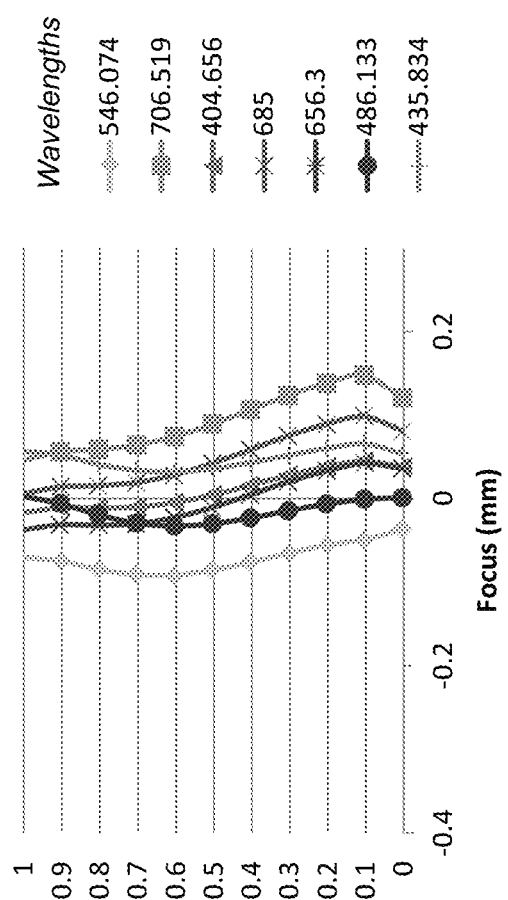
FIG. 9B is a graph that shows spherochromatism for an embodiment of the present invention.

The inventive design provides a number of advantages over conventional designs for telescopes and afocal imaging apparatus in general, including the following:
(i) Improved Strehl ratio. The graph of FIG. 8 compares polychromatic Strehl measurements vs. field angle for the design of FIG. 6 relative to designs shown in FIGS. 3A-3C and a seven-element normal glass design. The higher Strehl ratio of the FIG. 6 arrangement shows significant improvement over earlier designs.
(ii) Shorter track length. With respect to track length, the FIG. 6 arrangement is advantaged over the Petzval configuration, with a track length in the range 1.3 to 1.4× focal length.
(iii) Reduced spherochromatism. Spherochromatism is a measure of variation of spherical aberration with wavelength. It is advantageous to reduce spherochromaticism as much as possible; lower values indicate improved imaging. By way of example, FIG. 9A shows spherochromaticism for a commercially available apochromat triplet having well-corrected chromatic aberration. Spherochromaticism can be measured as distance along the x-axis direction in the graph representation shown. The graph of spherochromatism shows the focus position (x-axis) for rays passing through different regions of the pupil (y axis). Rays near the optical axis (with y height near zero) focus in one location and rays near the edge of the aperture (with y height near 1) focus in a different location. Over the visible wavelength range, spherochromaticism of as much as 0.45 is observed. FIG. 9B shows a comparative graph for the 3-group embodiment of FIG. 6. Here, over the visible wavelength range, spherochromaticism is within about +/−0.10 mm over the visible wavelength range 400-700 nm for a focal length of 1 m.

The basic arrangement shown in FIG. 6 can be modified in a number of ways for improvements to various performance aspects of the narrow FOV imaging system. Additional lens elements can be added to each group, provided that the lens element that lies closest to the object, the object-side lens element, is a flint glass of positive optical power. The flint glass lens element used for the object-side lens element can be a double-convex or meniscus lens, or may have one plano surface. Lens element sizes, curvatures, and air space distances can be varied to suit the design.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. Thus, what is provided is an apparatus and method for an improved achromatic telescope and narrow FOV optical system design.

The invention claimed is:
1. An apochromatic imaging system comprising:
a) an object-side lens group having at least an object-side lens element that lies nearest the object with positive refractive power and formed from a flint glass material with deviation of relative dispersion $-0.013 < \Delta P_{g,F} < +0.013$ and an Abbe number less than 50;
b) a middle lens group comprising at least a second lens element and a third lens element, wherein, one of the second and third lens elements has deviation of relative dispersion $-0.013 < \Delta P_{g,F} < 0.013$ and the other of the second and third lens elements has deviation of relative dispersion $0.013 < \Delta P_{g,F} < 0.04$; and
c) an image-side lens group having at least a fourth lens element.

2. The imaging system of claim 1 having a track length, wherein the track length does not exceed 1.4 times the focal length of the imaging system.

3. The imaging system of claim 1 wherein the fourth lens element has positive power and is of flint glass.

4. The imaging system of claim 1 wherein the fourth lens element lies closest to the image and has deviation of relative dispersion $-0.013 < \Delta P_{g,F} < +0.013$.

5. The imaging system of claim 1 wherein spherochromaticism is within about +/−0.10 mm over the visible wavelength range 400-700 nm for a focal length of 1 m.

6. The imaging system of claim 1 wherein the object-side lens group further comprises at least one other lens element.

7. The imaging system of claim 1 wherein the field of view is within +/−10 degrees.

8. The imaging system of claim 1 wherein the field of view is within +/−6 degrees.

9. The imaging system of claim 1 further comprising field flattener optics between the image-side lens group and the image plane.

10. An imaging system comprising:
a) an object-side lens group having at least an object-side lens element that lies nearest the object with positive refractive power and formed from a flint glass material with an Abbe number less than 50;
b) a middle lens group comprising a second lens element that has positive refractive power and a third lens element that has a negative refractive power; and
c) an image-side lens group having at least an image-side lens element,
wherein the object-side lens element, the third lens element, and the image-side lens element have a near normal deviation of relative dispersion $-0.013<\Delta P_{g,F}<+0.013$,
and wherein the second lens element has a moderately anomalous deviation of relative dispersion $0.013<\Delta P_{g,F}<0.04$.

11. The imaging system of claim 10 having a track length, wherein the track length does not exceed 1.4 times the focal length of the imaging system.

12. The imaging system of claim 10 wherein the image-side lens element uses a positive flint glass.

13. The imaging system of claim 10 wherein the object-side lens group further comprises at least one additional lens element.

14. The imaging apparatus of claim 10 wherein the imaging system is a telescope.

15. A telescope optical system comprising:
a) an object-side lens group having an object-side lens element that lies nearest the object with positive refractive power and formed from a flint glass material with deviation of relative dispersion $-0.013<\Delta P_{g,F}<+0.013$ and an Abbe number less than 50;
b) a middle lens group between the object-side lens group and an image-side lens group, wherein the middle lens group has a second lens element that has positive refractive power and that is formed from an anomalous glass material and a third lens element that has negative refractive power and is formed from a non-anomalous glass material;
and
c) wherein the image-side lens group has a fourth lens element formed from a non-anomalous glass material.

16. The telescope optical system of claim 15 wherein the fourth lens element is formed from a flint glass material.

17. The telescope optical system of claim 15 further comprising an optical field flattener between the image and the image-side lens group.

18. The telescope optical system of claim 15 wherein the track length is less than or equal to 1.4 times the focal length.

19. The telescope optical system of claim 15 wherein the object-side lens group has a single lens element of the flint glass material.

* * * * *